United States Patent [19]
Frame

[11] 3,751,828
[45] Aug. 14, 1973

[54] REIN MANIPULATION TRAINING DEVICE

[76] Inventor: Wayne W. Frame, 3300 Bridger Trl., Apt. 109, Boulder, Colo. 80301

[22] Filed: Feb. 16, 1971

[21] Appl. No.: 115,563

[52] U.S. Cl. .................................. 35/11, 35/29 R
[51] Int. Cl. ............................................. G09b 9/00
[58] Field of Search .................. 35/11, 29 R; 54/36; 272/52, 52.5, 53.1, 53.2

[56] References Cited
UNITED STATES PATENTS
| | | | |
|---|---|---|---|
| 13,306 | 7/1855 | Goddard | 54/36 |
| 1,372,351 | 3/1921 | Jones | 272/53.2 X |
| 1,729,227 | 9/1929 | Reid | 35/29 R X |
| 2,260,432 | 10/1941 | Brown | 35/11 |
| 3,209,469 | 10/1965 | James | 35/17 |

FOREIGN PATENTS OR APPLICATIONS
178,110  11/1906  Germany .............................. 35/11

Primary Examiner—Harland S. Skogquist

[57] ABSTRACT

This invention relates to a training apparatus and more particularly to an apparatus for training a person to manipulate the reins of a full or double bridle as used in equitation.

2 Claims, 5 Drawing Figures

PATENTED AUG 14 1973     3,751,828

SHEET 1 OF 2 ated curb bit as determined by a sufficent lever 6 displacement, being equivalent to a correct level of port and chain pressure with an actual bit.
REIN MANIPULATION TRAINING DEVICE

SUMMARY OF THE INVENTION

The intended purpose of this invention is to be that of a training aid and exercising device for the development of manual dexterity as required for proper manipulation of a full or double bridle as used in equitation, particularly at the stage of training where one is learning to differentiate between the snaffle bit and curb bit by proper hand and finger manipulation of the snaffle rein and crub rein. Alternate use of the snaffle and curb bits is useful to "collect" a horse. Use of the curb bit alone will result in a lower head position, etc.. The necessary manual dexterity to so manipulate the bits independently is difficult to learn but is essential to expert horsemanship.

The apparatus described below simulates by mechanical means the tactile feel of the snaffle bit and curb bit in the mouth of a horse. The object of this invention is to aid learning by providing a means for positive indication to the user upon proper actuation of the bits, student feedback. A further object of this invention is to provide a tireless simulator on which to practice. The device is not meant to deemphasize the role of an actual mount in learning the art of equitation, but rather to function as a supplemental tool allowing actual time in the riding ring to be more profitably spent for both student and instructor.

A more detailed description of the specific embodiment of this invention is given below.

DETAILED DESCRIPTION

Figure 1:
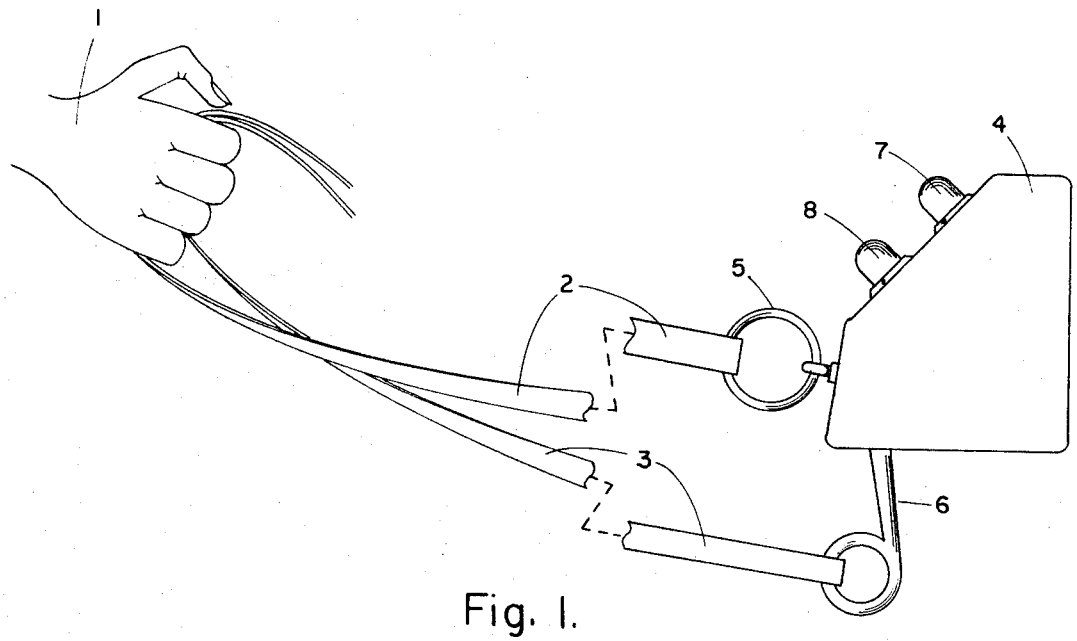
FIG. 1 shows side view of apparatus and the right hand of a student operator.

Reference is now made to FIG. 1. Snaffle rein 2 and curb rein 3 are held in the right hand 1 of the student in the same manner as a mounted rider, the apparatus 4 being positioned in front of said student to which reins 2 and 3 are connected. Similarly the left snaffle and curb reins are held in the left hand of the student. The apparatus utilizes a suitable means for anchorage such as a tripod or wall mount, the height of the apparatus above the floor being commensurate with the correct hands to simulated bit positioning when the subject is seated a suitable distance from said apparatus.

Figure 3:
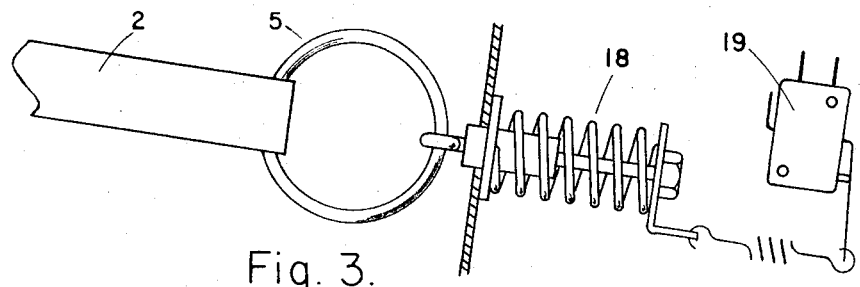
FIG. 3 shows arrangement of snaffle elements.

FIG. 3. Snaffle rein 2 is connected to ring 5 which functions to simulate the ring of a snaffle bit. Ring 5 is coupled to the apparatus by a spring loaded mechanism 18 which serves to simulate the tactile feel of a snaffle bit in the mouth of a horse. Electrical switch 19 or other suitable means senses actuation of the simulated snaffle bit as determined by a sufficent ring 5 displacement toward the student operator, being equivalent to a correct amount of snaffle bit pressure on the corners of a horse's mouth.

Figure 2:
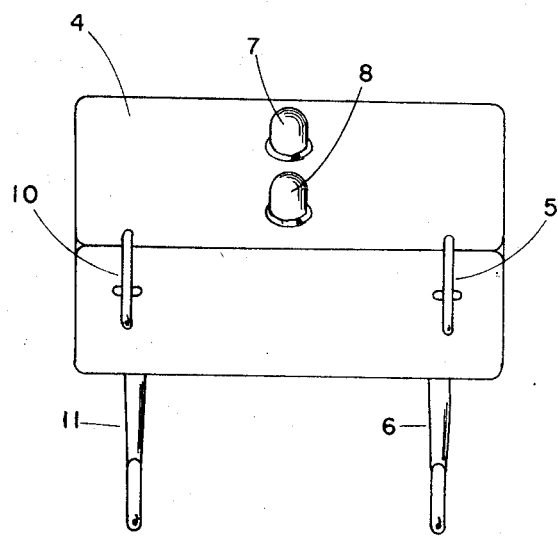
FIG. 2 is a front view of apparatus, less reins.

FIG. 2. A snaffle bit is jointed at the middle, thus allowing the possibility for each side to move independently. A right ring 5 and a left ring 10, each independently mounted and a plurality of sensing elements allows for independent sensing of right and left snaffle action.

Figure 4:
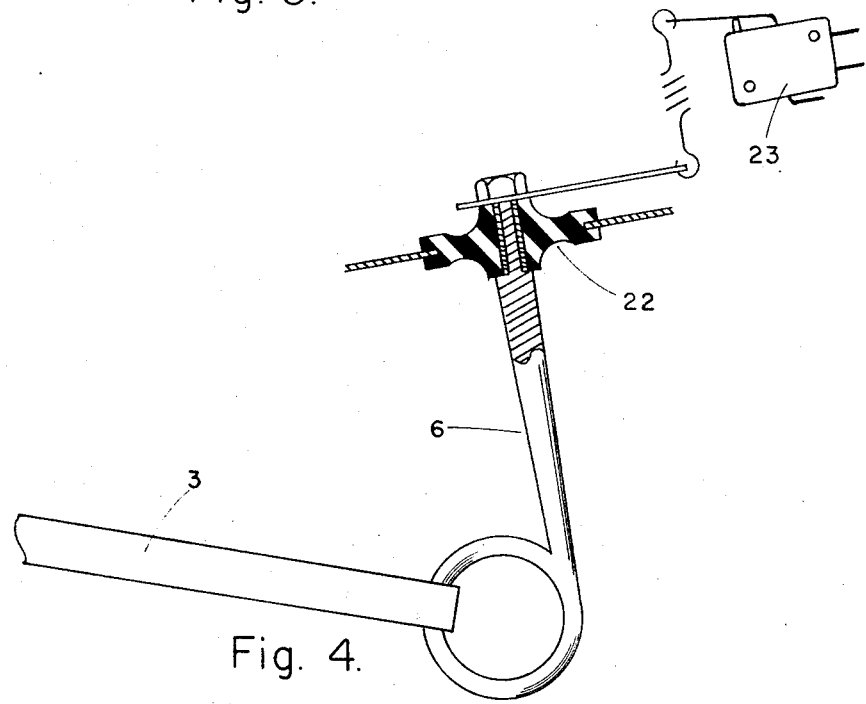
FIG. 4 shows arrangement of curb elements.

FIG. 4. Curb rein 2 is connected to lever 6 which functions to simulate the shank of a curb bit. Lever 6 is mounted by a rubber diaphragm or other suitable means which functions to simulate the feel of a curb bit in the mouth of a horse. Electrical switch 23 or other suitable means functions to sense actuation of the simulated curb bit as determined by a sufficent lever 6 displacement, being equivalent to a correct level of port and chain pressure with an actual bit.

FIG. 2 A right lever 6 and a left lever 11 together with right and left sensing elements allows for the sensing of right and left curb rein tension independently.

Figure 5:
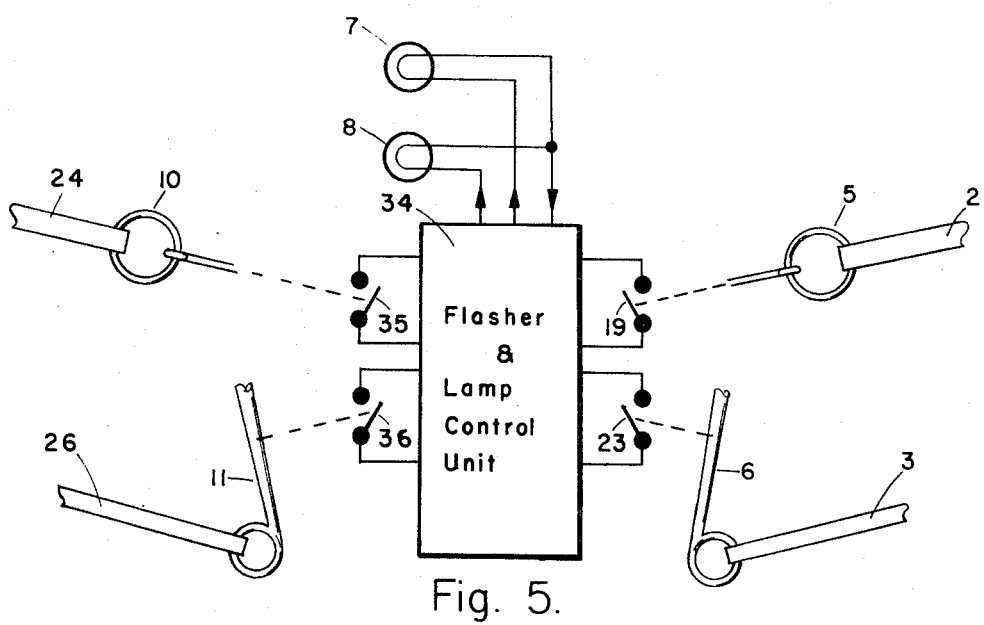
FIG. 5 is a schematic diagram of possible embodiment.

FIG. 5. Sensing elements 35, 36, 19 and 23 are connected to indication elements which provide means for student feedback such as snaffle indication Lamp 7 and curb Lamp 8. Lamps of different colors provide a method for easy differentiation such as white and blue lamps, red and green lamps being less satisfactory because of the stop and go connotation of these colors. Other forms of student feedback such as audible tone generators could be implemented.

Means for student indication of right or left only actuation is provided by flasher unit 34 which causes the appropriate lamp to flash at approximately five flashes per second if only one side of the simulated bit is correctly actuated, thus enhancing the information relayed to the student.

The apparatus functions as a training aid by indicating correct response results to the student and as an exercising device by providing a simulator on which to practice. Many changes and modifications can be made in the embodiment of the invention described above. The scope of the invention is intended to be limited only by the scope of the appended claims.

I claim as my invention:

1. A device for training persons to develop the manual dexterity needed to differentiate between the snaffle rein and the crub rein of a double bridle comprising a pair of rings which are spring loaded or elastically mounted to simulate the tactile feed of a snaffle bit in the mouth of a horse each end of a snaffle rein being attached to said rings, a second set of rings which are suitably mounted to simulate the tactile feel of a curb bit each end of a curb rein being attached to said second set of rings, switch means to sense actuation as defined by the correct amount of rein tension and resulting simulated bit displacement from rest position, a lamp controlled by suitable circuit logic to indicate to a person snaffle bit actuation, a second lamp to indicate curb bit actuation; whereby a person can readily determine if he is manipulating the simulated bits independently.

2. The training device of claim 1 in which right and left sensing elements allow for the sensing of right and left snaffle rein tension independently, right and left sensing elements allow for sensing of right and left curb rein tension independently, means for indicating to subject right or left only actuation whereby an unbalanced condition can be communicated to the person.

* * * * *